United States Patent [19]
Nemoto

[11] Patent Number: 5,704,726
[45] Date of Patent: Jan. 6, 1998

[54] BALL-AND-SOCKET JOINT

[75] Inventor: Akira Nemoto, Toyohashi, Japan

[73] Assignee: Musashi Seimitsu Kogyo Kabushiki Kaisha, Aichi-ken, Japan

[21] Appl. No.: 674,648

[22] Filed: Jun. 25, 1996

[30] Foreign Application Priority Data

Dec. 28, 1995 [JP] Japan ................... 7-354367

[51] Int. Cl.$^6$ ................... F16C 11/00
[52] U.S. Cl. ................... 403/133; 403/132; 403/144
[58] Field of Search ................... 403/122, 128, 403/129, 130, 132, 133, 135, 137, 144

[56] References Cited

U.S. PATENT DOCUMENTS

| | | | |
|---|---|---|---|
| 3,967,907 | 7/1976 | Schmidt | 403/133 |
| 4,063,834 | 12/1977 | Hanson et al. | 403/138 |
| 4,187,033 | 2/1980 | Zukowski | 403/137 |
| 4,478,531 | 10/1984 | Levinson et al. | 403/77 |
| 4,626,121 | 12/1986 | Tajima et al. | 403/132 X |
| 4,690,581 | 9/1987 | Umemoto et al. | 403/133 |
| 4,797,019 | 1/1989 | Wood, Jr. | 403/133 |
| 5,116,159 | 5/1992 | Kern et al. | 403/132 |

FOREIGN PATENT DOCUMENTS

| | | | |
|---|---|---|---|
| 0177312 | 8/1987 | Japan | 403/132 |
| 0116315 | 5/1989 | Japan | 403/135 |
| 1451811 | 10/1976 | United Kingdom . | |
| 2108196 | 5/1983 | United Kingdom . | |

*Primary Examiner*—Kenneth J. Dorner
*Assistant Examiner*—William L. Miller
*Attorney, Agent, or Firm*—Ladas & Parry

[57] ABSTRACT

A ball-and-socket joint used in a linkage mechanism of the motor vehicle steering device has a ball head of a shank, encompassed by a bearing in a housing. The housing has an end opening at the opposite side of the shank. A joining member made up of a head part and a male screw portion is fitted in the opening at the head part. The head part is integrally formed with a peripheral flange, preferably a flange of flared shape. The surface of the flange is covered with an elastic layer. A fixing ring abuts against the flange to prevent detachment of the joining member from the housing. A closure plate may be interposed between the flange and the bearing and between the flange and the housing. Vibration and shocks imparted to the ball head through the shank is absorbed by the elastic layer without increasing the diametrical dimension of the joint.

17 Claims, 7 Drawing Sheets

BALL-AND-SOCKET JOINT

BACKGROUND OF THE INVENTION

The present invention relates to a ball-and-socket joint used in linkage mechanisms such as steering devices of motor vehicles.

The steering devices have a linkage mechanism connecting a wheel support member with a steering shaft having steering wheel. A ball-and-socket joint of the kind according to the present invention has been used in such linkage mechanism. The wheel support member is connected through a joint with a tie rod at one end of the ball-and-socket joint. This ball-and-socket joint is connected at the other end thereof with a rack shaft having a rack. The rack shaft is located within a rack assembly and is meshed with a steering gear provided at an end of a steering shaft. When the steering wheel is rotated by the driver, the rotary movement thereof is converted into linear movement of the rack shaft through the meshing steering gear and rack and through the ball-and-socket joint, whereby the tie rod is linearly moved so that the wheel support member is pulled or pushed to change the direction of the wheel for steering.

The ball-and-socket joint used in the above stated steering device comprises a ball head provided at an end of a shank of the tie rod, a bearing encompassing and slidably holding the ball head, a housing holding the bearing therein and having at an end thereof an opening through which the shank extends outward, and a joining member provided at another end of the housing for joining the housing to the rack shaft. Such ball-and-socket joint is disclosed, for example, in Japanese Unexamined Utility Model Laid-Open No.61-59911 published Apr. 22, 1986 and Japanese Unexamined Patent Laid-Open No. 63-57912 published Mar. 12, 1988.

While a motor vehicle is running, the steered wheels sometimes run over irregularities on the road and receive vibration and shocks. The wheels receive vibration and shocks when the vehicle starts or stops abruptly. Such vibration and shocks are transmitted from the wheels to the steering wheel via the wheel support members, the linkage mechanism including the ball-and-socket joint, the rack shaft and the steering shaft. This means that the ball-and-socket joint did not function to absorb the vibration and shocks, which adversely affect the running performance of the motor vehicle and give an uncomfortable sensation to the driver.

For the purpose of absorbing vibration and shocks from the wheels, a tie rod joint was proposed in Japanese Unexamined Utility Model Laid-Open No. 61-49268 published in Jul. 5, 1994. This tie rod joint comprises a cylindrical elastic member interposed between an end portion of a tie rod and a tie rod socket coaxially receiving the end portion of the tie rod. Vibration and shocks transmitted from the wheels are converted into and absorbed by elastic deformation of the cylindrical elastic member so that the vibration and shocks are seldom transmitted beyond the joint. However, in this known joint, the cylindrical elastic member is interposed between the inner tie rod and the outer tie rod housing so that the tie rod housing must necessarily be enlarged in diameter with the resultant increase of the diametrical dimension of the joint. This increased diametrical dimension of the joint is not desirable from the viewpoint of layout design because there are the suspension devices, stabilizer and so on in the neighborhood of the joint. The increased diametrical dimension of the joint is also not desirable because it increases the weight of the joint. Furthermore, the cylindrical elastic member is not effective to absorb vibration and shocks in the longitudinal direction of the linkage mechanism.

SUMMARY OF THE INVENTION

It is a main object of the present invention to provide a ball-and-socket joint of the kind described before, which can effectively absorb vibration and shocks and which is compact and of light weight.

According to the present invention, the above object is achieved by a ball-and-socket joint comprising: a ball head provided at an end of a shank of a tie rod; a bearing encompassing and slidably holding the ball head; a housing holding the bearing therein and having at a first end thereof an opening through which the shank extends outward; and a joining member provided at a second end of the housing for joining the housing to another member; the ball-and-socket joint being characterized by comprising a second end opening provided in the second end of the housing; a head part formed on the joining member and having a peripheral flange formed on the head part, the head part and the peripheral flange defining an end surface facing the bearing, said peripheral flange being snugly fitted in the second end opening; and elastic means provided on the end face of the joining member so as to be interposed between the housing and the end face.

The ball-and-socket joint further comprises a fixing ring fitted and secured in the second end opening to abut the flange to prevent detachment of the joining member from the housing.

The ball-and-socket joint may further comprise a closure plate interposed between the elastic means on the end face and the housing.

The peripheral flange may be of a flared shape diverging toward the bearing whereby the end face is also of a flared shape. In this case, the inner surface of the bearing, facing the joining member may be made to have a shape complementary to the shape of the flared end face.

Preferred embodiments of the present invention will be understood from the following detailed description with reference to the accompanying drawings.

3

DESCRIPTION OF THE PREFERRED EMBODIMENTS

Figure 1:
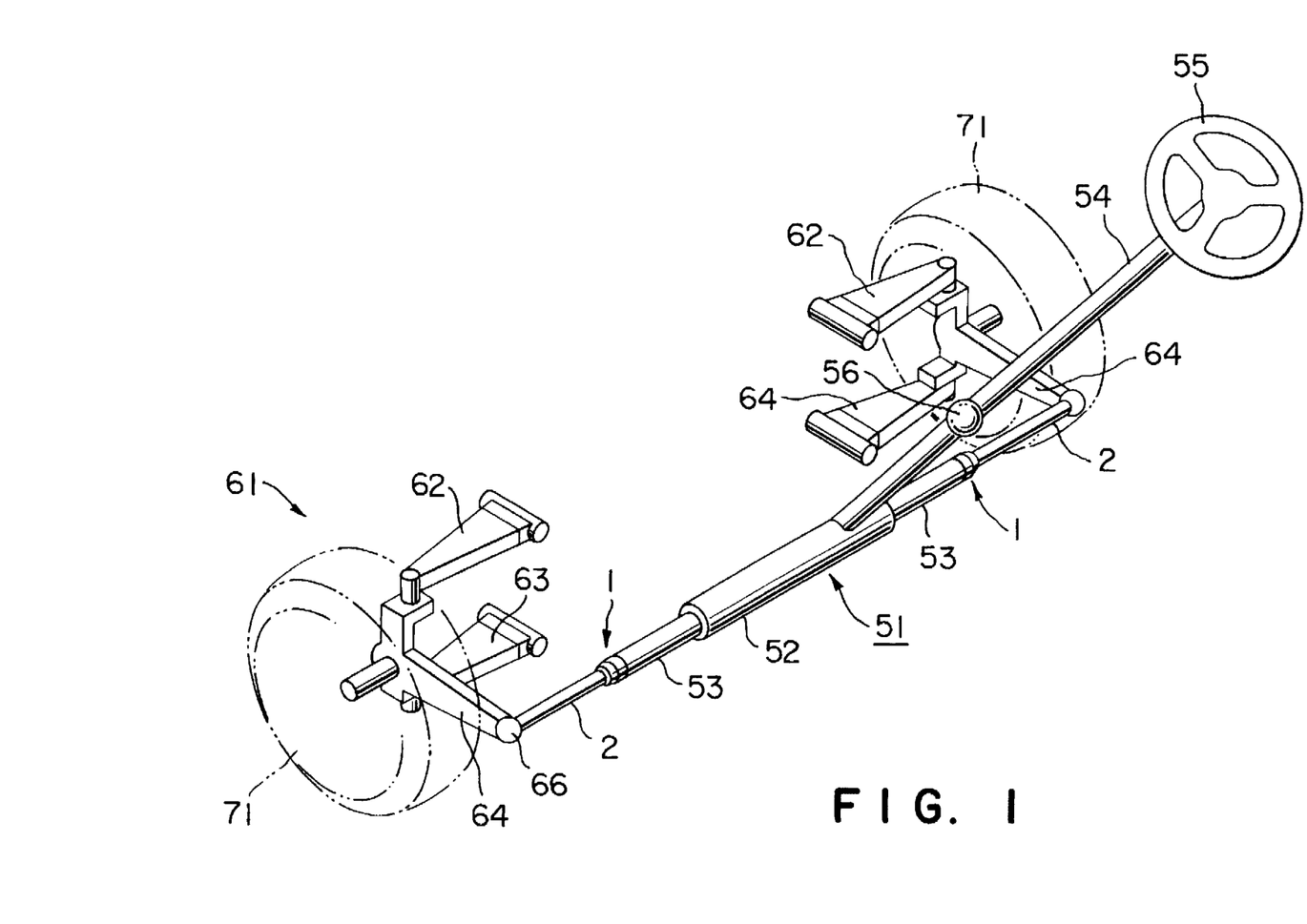
FIG. 1 is a schematic perspective view showing a steering device for a motor vehicle, in which the ball-and-socket joint of the present invention is incorporated.

Referring to FIG. 1, there is illustrated a steering device 51 for a motor vehicle, in which a ball-and-socket joint 1 of the present invention is incorporated. Wheels 71 are rotatably supported by wheel support members 64, respectively. Each wheel support member 64 is connected to the motor vehicle chassis through an upper arm 62 and a lower arm 63 as is known in the art. The wheel support member 64 and the upper and lower arms 62 and 63 constitute a suspension device 61.

To the wheel support member 64 is joined a tie rod 2 of the ball-and-socket joint 1 of the present invention, through a joint device 66 such as a ball-and-socket joint. The ball-and-socket joint 1 is connected with a shaft 53 of a rack, which is linearly shiftable in a known rack assembly 52. The rack is located within the rack assembly 52 and is in mesh with a steering gear (not shown) provided at an end of a steering shaft 54 extending from a steering wheel 55. When the steering wheel 55 is rotated, the rotary movement thereof is converted into linear movement of the rack shaft 53 and the tie rod 2 via the mutually meshing steering gear and rack, whereby the wheel support member 64 is pulled or pushed to change the direction of the wheel 71.

Figure 2:
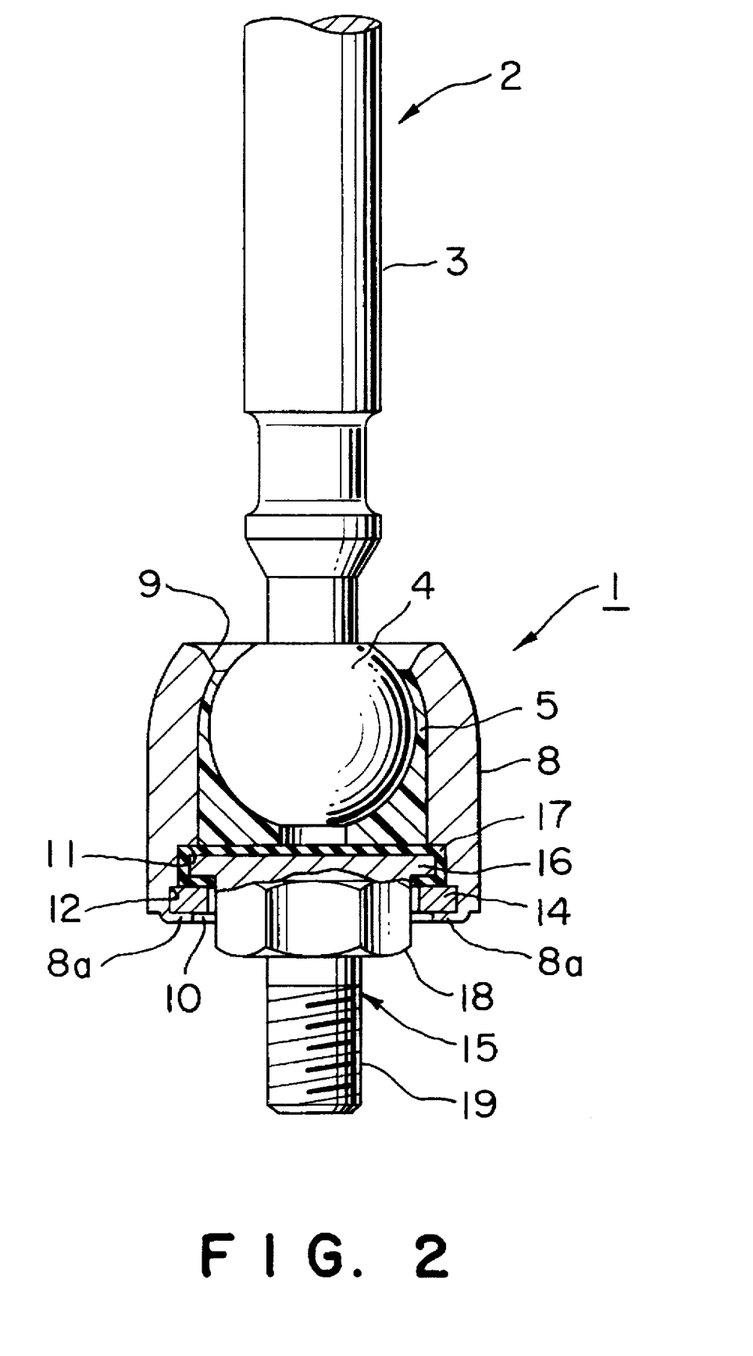
FIG. 2 is a longitudinal section of a first embodiment of the ball-and-socket joint of the present invention.

The ball-and-socket joint 1 that is used in the steering device 51 will be described below in detail. As shown in FIG. 2, the tie rod 2 comprises a shank 3 and a ball head 4 that is integral with the shank 3 and is in the form of a sphere. The ball-and-socket joint 1 has a socket housing 8 of substantially cylindrical shape and a bearing 5 firmly held in the housing 8. The bearing 5 is made of a synthetic resin such as a polyacetal resin and has a spherical hollow interior slidably receiving the ball head 4 as shown. The housing 8 is open at a first end as indicated at 9 through which the shank 3 of the tie rod 2 extends outward. The bearing 5 is also open at the corresponding end to partly expose the ball head 4.

Figures 3, 4:
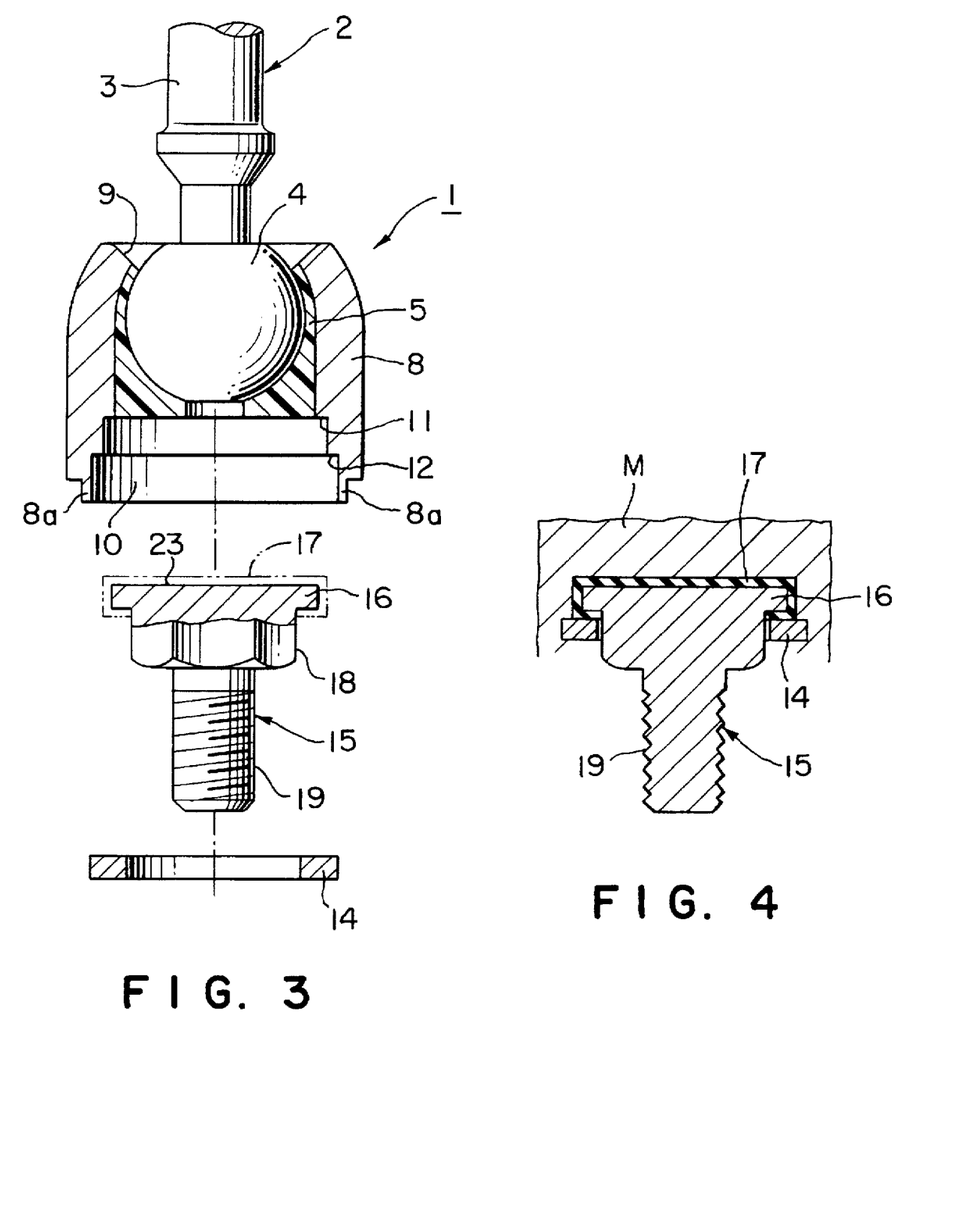
FIG. 3 is an exploded view of the ball-and-socket joint shown in FIG. 2.
FIG. 4 is a fragmentary sectional view explanatory of how an elastic layer is formed.

As shown in the exploded view of FIG. 3, the housing 8 has at an opposite second end an opening 10 that is larger than the opening 9. The opening 10 is of a stepped configuration having an inner opening with a shoulder 11 and an enlarged outer opening with a shoulder 12. A joining member 15 is shown as a headed bolt having a head part 18 and a male screw part 19. The head part 18 is in the form of a nut of hexagonal cross section. The head part 18 has at the top thereof a peripheral flange 16 extending radially outward of the head. The head part 18 and the peripheral flange 16 define a planar end surface 23 (FIG. 3) facing the bearing 5. An elastic layer 17 is provided to cover the end face 23 and the bottom and peripheral surfaces of the flange 16. The elastic layer is made of rubber or an elastic synthetic resin.

The joining member 15 is secured in the opening 10 as shown in FIG. 2 with the elastic layer 17 on the top of the head part 18 in abutting engagement with the shoulder 11 and the bearing 5. To fix the joining member 15 in the opening 10, a metal fixing ring 14 is fitted in the opening 10 so as to abut against the shoulder 12. The fixing ring 14 is then fixedly secured in position by plastically deforming the peripheral portion of the opening 10 as indicated at 8a in FIG. 2. The male screw part 19 of the joining member 15 is used to join the ball-and-socket joint 1 with the rack shaft 53 shown in FIG. 1.

4

The ball-and-socket joint 1 is assembled in the manner described below.

The joining member 15 and the fixing ring 14 are placed in a mold M, as shown in FIG. 4, maintaining the same relative position of the member 15 and the ring 14 as are taken when they are assembled as indicated in FIG. 2. For this purpose they are preliminarily attached to each other by means of an adhesive and so on. More specifically, when the joining member 15 and the fixing ring 14 are placed in the mold M maintaining the relative position, predetermined clearances are provided between the mold M and the top and bottom peripheral surfaces of the flange 16 and between the bottom peripheral surfaces of the flange 16 and the surface of the fixing ring 14, facing the bottom surface of the flange 16. Then, material for forming the elastic layer 17 is supplied in molten state into the mold M to fill the clearances. As a result, the elastic layer 17 is formed integrally as shown in FIG. 4. The joining member 15 and the fixing ring 14 are then taken out of the mold M, together with the elastic layer 17 formed thereon.

When the ball-and-socket joint 1 is to be assembled, the bearing 5 is first applied to the ball head 4 such that the bearing 5 encompass and hold the ball head 4. Then the stem 3 and the ball head 4 together with the bearing 5 are moved into the housing 8 from the side of the larger opening 10 toward the smaller opening 9. The stem 3 is passed through the opening 9 so as to extend outward therefrom, as shown in FIG. 3, and the bearing 5 encompassing the ball head 4 is fixedly secured in the housing 8.

The assembly of the joining member 15 and the fixing ring 14 are then inserted into the opening 10 until the elastic layer 17 on the top surface of the flange 16 is brought into abutment against the shoulder 11 and the bearing 5. When the elastic layer 17 on the top surface of the flange 16 abuts against the shoulder 11, the fixing ring 14 also abuts against the shoulder 12. Furthermore, the elastic layer 17 on the peripheral surface of the flange 16 fits into the smaller peripheral opening having the shoulder 11. Thereafter, the peripheral portion 8a of the opening 10 is plastically deformed radially inward as shown in FIG. 1, whereby the fixing ring 14 is firmly held in the housing 8 and the joining member 15 is fixed in position in the housing 8.

In the ball-and-socket joint 1 thus assembled, vibration and shocks transmitted from the wheel 71 are absorbed by the elastic layer 17 in the joint 1 and are not transmitted further to the ball head 4 and the tie rod 2. Since the elastic layer 17 is provided between the housing and the top surface of the head part 18 of the joining member 15 and between the flange 16 and the fixing ring 14, the elastic layer 17 does not increase the radial dimension of the ball-and-socket joint. The elastic layer 17 on the peripheral surface of the flange 16 does not significantly increase the radial dimension of the ball-and-socket joint and may be omitted, if so required.

The flange 16 extending radially outward of the head part 18 of the joining member 15 has an outer diameter greater than the inner diameter of the fixing ring 14. Therefore, the strength for resisting the removal of the joining member 15 from the housing 8 can be made large.

Figure 5:
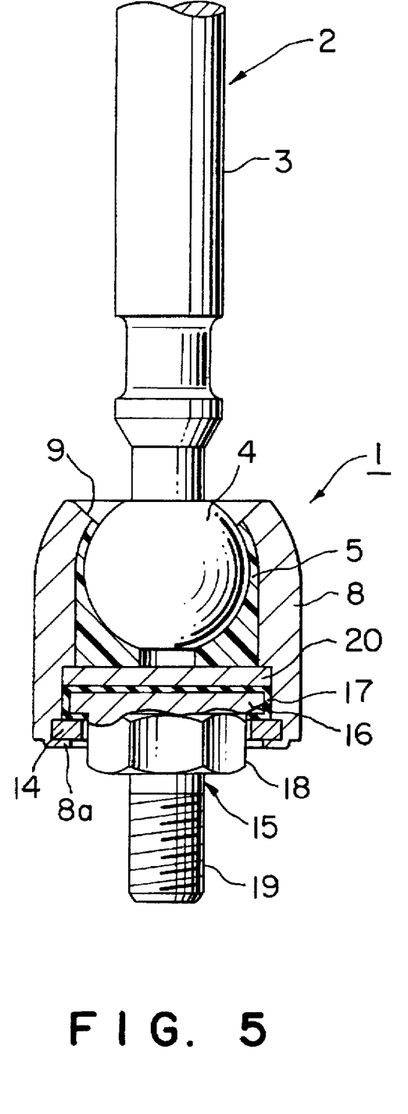
FIG. 5 is a longitudinal section of a second embodiment, of the present invention.

A second embodiment of the present invention will be described with reference to FIG. 5. In this second embodiment, a closure plate 20 is additionally provided between the bearing 5 and the elastic layer 17 on the flange 16 of the joining member 15 in the embodiment of FIG. 2. The closure plate 20 may be secured to the elastic layer 17 with an adhesive. The closure plate 20 may be made of steel and is in abutting contact with the shoulder 11 (FIG. 3). The closure plate 20 serves to immovably hold the bearing 5 within the housing 8, whereby loose fit of the internal members of the ball-and-socket joint is prevented.

Figure 6:
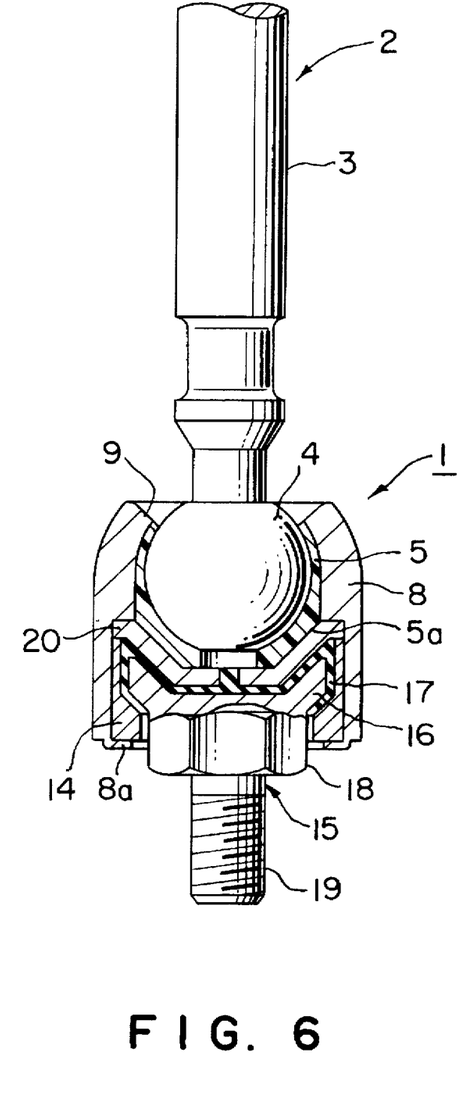
FIG. 6 is a longitudinal section of a third embodiment of the present invention.
Figure 7:
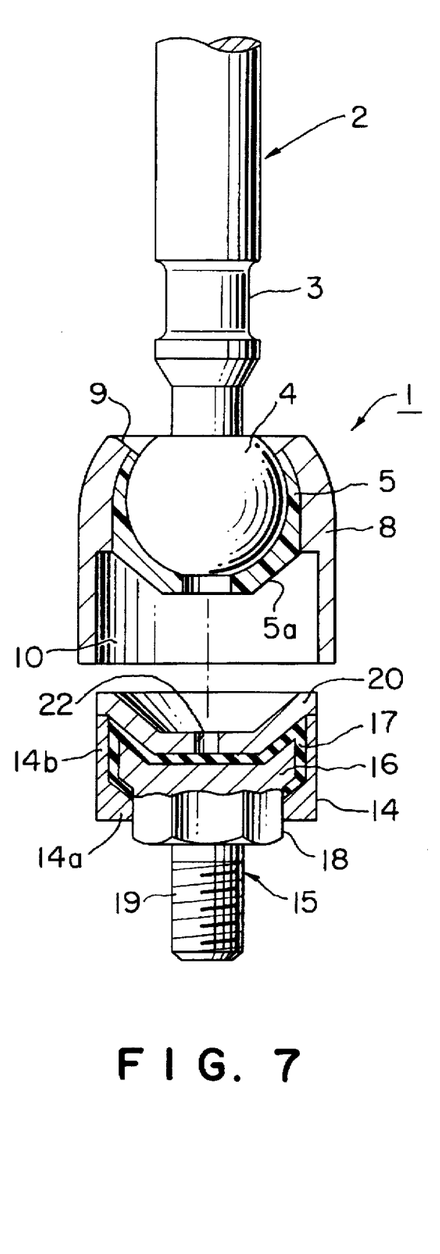
FIG. 7 is an exploded view of the ball-and-socket joint shown in FIG. 6.

FIGS. 6 and 7 show a third embodiment of the present invention. In this embodiment, the flange 16 of the head part 18 of the joining member 15 is formed in a flared shape diverging toward the tie rod 2. Therefore, the end face of the head part 18 and the flange 16 is also flared. The flared shape may be either a frust-conical shape or a curved flared shape. A closure plate 20 of a correspondingly flared shape may be provided. The closure plate 20 could be dispensed with.

In this embodiment, the inner surface 5a of the bearing 5 is formed in sloped complementary shape relative to the flared shape of the closure plate 20 or the flange 16. The fixing ring 14 used in this embodiment is not in the form of a planar ring but in the form of a cylinder having a thickened base end 14a (FIG. 7). The base end 14a has an inner inclined surface corresponding to the flared shape of the flange 16. A cylindrical portion 14b of the fixing ring 14 encompasses the peripheral surface of the flared flange 16 and is in contact with the closure plate 20 as shown. An elastic layer 17 is formed in clearances between the flange 16 and the closure plate 20 and between the flange 16 and the fixing ring 14. The elastic layer 17 can be formed by supplying the elastic material in molten state into a mold in which the joining member 15, the closure plate 20 and the fixing plate 14 are placed in a predetermined relative position. To enable the molten material to flow into the clearances, the closure plate 20 is formed with a hole 22 as shown in FIG. 7. The large opening 10 in this embodiment has a uniform diameter.

In the third embodiment described above, the flange 16 of the joining member 15 is flared toward the tie rod 2 so that the surface area of the elastic layer 17 is increased whereby the vibration absorbing capability of the ball-and-socket joint is improved. Further, in the case where the closure plate 20 is formed in a flared shape diverging toward the tie rod 2, the vibration absorbing capability is likewise improved. Furthermore, the sloped or conical surface 5a of the bearing 5 cooperates with the flared surface of the closure plate 20 or the elastic layer 17 for carrying out self-centering operation.

Figure 8:
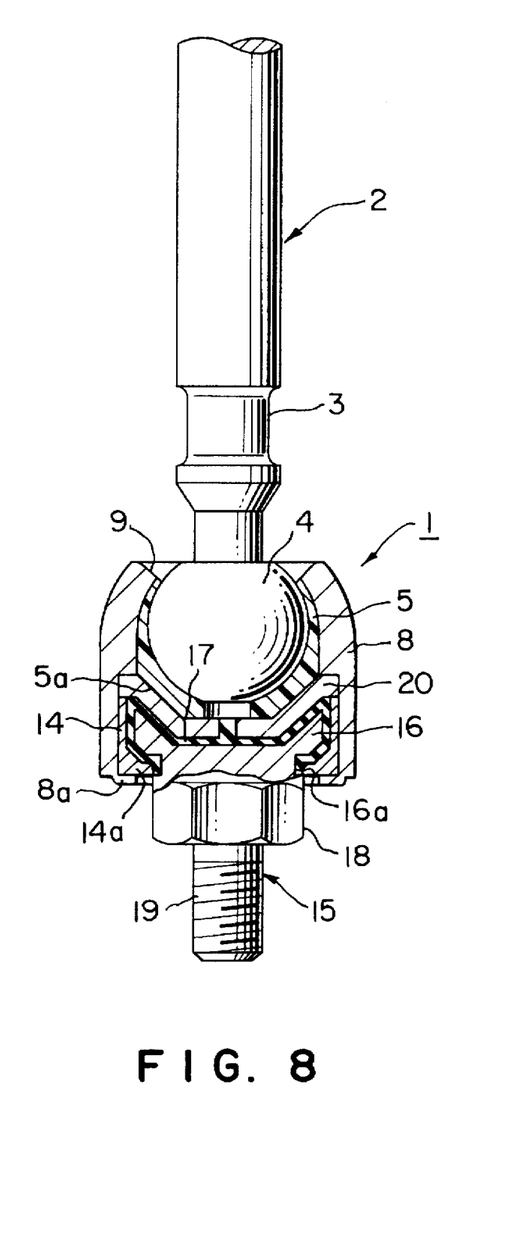
FIG. 8 is a longitudinal section of a fourth embodiment of the present invention.

FIG. 8 shows a fourth embodiment of the present invention. This embodiment is a modification of the third embodiment of FIGS. 6 and 7. The only difference between the third and fourth embodiments is that in the fourth embodiment an annular circumferential groove 16a is formed below the flange 16 of the joining member 15 and the base end 14a of the fixing ring 14 has an inner diameter smaller than the inner diameter of the base end 14a of the fixing ring 14 of the third embodiment so that the strength against detachment of the joining member 15 is increased and an elastic layer 17 is also formed in the groove 16a. This additional elastic layer further improves the damping capability of the ball-and-socket joint.

Figure 9:
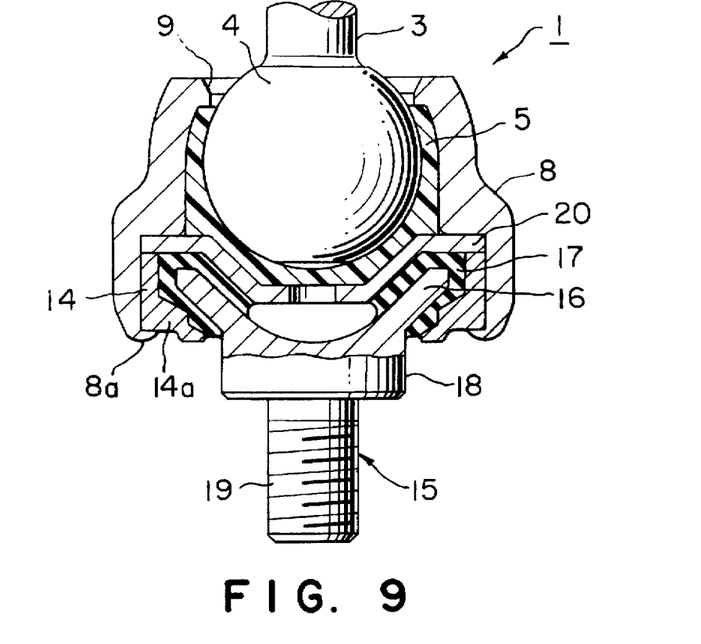
FIG. 9 is a longitudinal section of a fifth embodiment of the present invention.

A fifth embodiment shown in FIG. 9 differs from the fourth embodiment of FIG. 8 in that the flared flange 16 has a peripheral edge of rounded cross section and the elastic layer 17 of rubber is applied only to the flared portion of the flange 16. The elastic layer 17 is applied to both the inner and outer surfaces of the flared portion. In this embodiment the elastic layer 17 is attached to the flange 16, closure plate 20 and fixing ring 14 by baking rather than pouring it into a mold. Since the elastic layer 17 is applied only in the peripheral portion of the flange 16, there is no elastic layer in the central region on the head part 18 as shown. This embodiment is especially advantageous in avoiding large shearing force applied to the elastic layer 17 with resultant long life thereof because of the rounded cross-sectional shape of the flange 16 and in attaining self-centering function of the ball-and-socket joint because of the flared configuration. The elastic layer 17 may be attached to the flange 16 by means other than baking.

Figure 10:
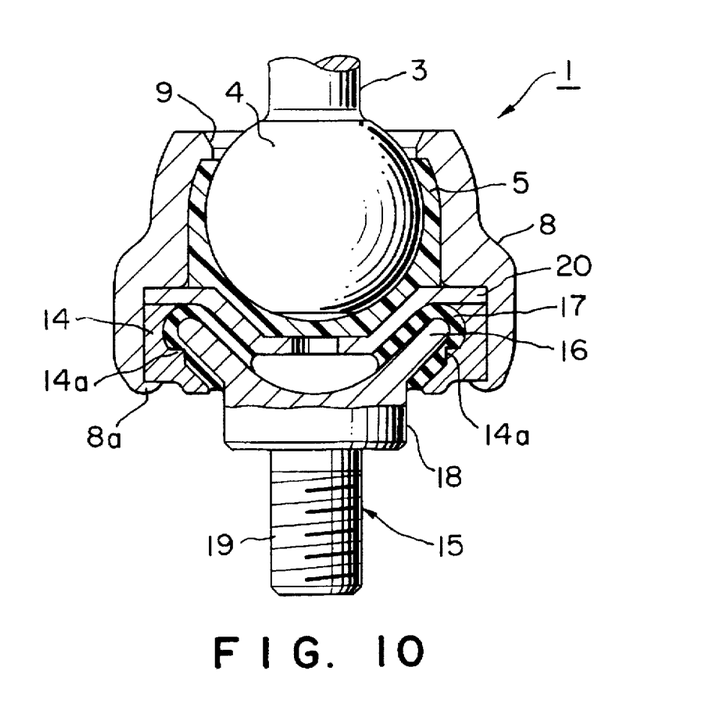
FIG. 10 is a longitudinal section of a sixth embodiment of the present invention.

FIG. 10 shows a sixth embodiment of the invention, which is a modification of the embodiment of FIG. 9. When vibration is imparted to the elastic layer 17 for a long time, there occurs a possibility of the elastic layer being melted because of repetitive movement of the elastic layer relative to the members in contact therewith. In order to prevent this, the ball-and-socket joint of FIG. 10 has a protrusion or protrusions 14a on the inner surface of the fixing ring 14. The protrusion 14a may be an annular rib, or the protrusions 14a may be a plurality of spot projections. The protrusion or protrusions 14a project into the elastic layer 17 to prevent movement of the elastic layer 17 relative to the fixing ring 14 and hence the flange 16. Therefore, the melting of the elastic layer 17 as a result of vibration can be prevented. The shape of the protrusion or protrusions 14a may be changed appropriately.

Figure 11:
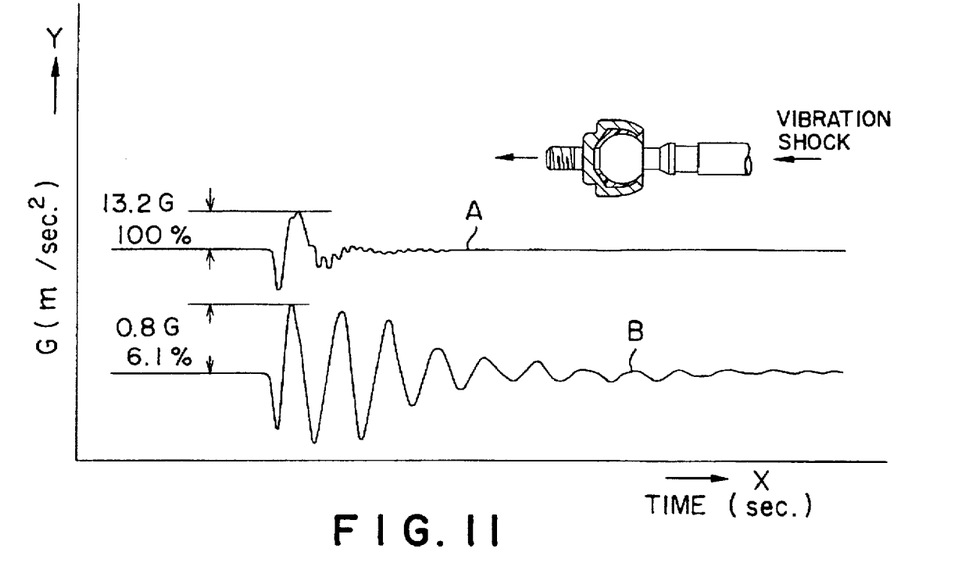
FIG. 11 is a graph showing how vibration and a shock inputted to a known ball-and-socket joint is transmitted to the output side.
Figure 12:
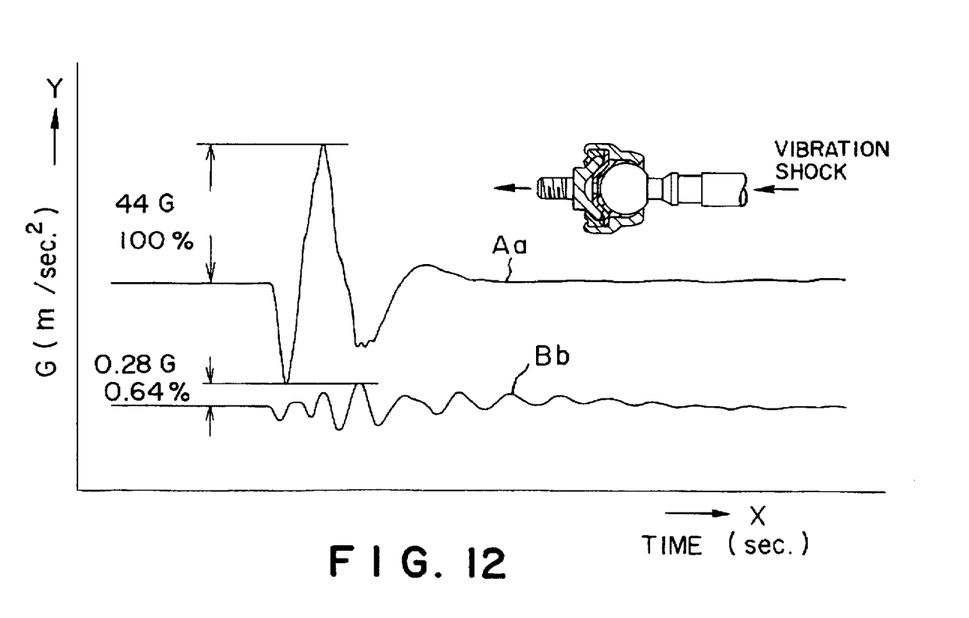
FIG. 12 is a graph showing how vibration or a shock inputted to the ball-and-socket joint shown in FIG. 9 is transmitted to the output side.

A comparison of FIG. 11 and FIG. 12 reveals that the vibration or shock absorbing effect of the ball-and-socket joint of the present invention is superior to that of the conventional joint without an elastic layer. FIG. 11 is a graph showing a case of a conventional joint without an elastic layer with the X-axis representing time in sec. and the Y-axis representing longitudinal acceleration. Vibration or a shock was inputted to the joint as indicated by curve A in this graph. The output was as indicated by curve B. Inputted maximum vibrational acceleration was 13.2 G (G is the gravitational acceleration), while outputted maximum vibrational acceleration was 0.8 G which amounts to 6.1% when 13.2 G is taken as 100%.

FIG. 12 is a graph showing a case of the joint shown in FIG. 9. Vibration or a shock was inputted to the joint as indicated by curve Aa in this graph. The output was as indicated by curve Bb. Inputted maximum vibrational acceleration was 44 G, while outputted maximum vibrational acceleration was 0.28 G which is as small as 0.64% of the inputted vibrational acceleration. It will be apparent that compared with the relatively large acceleration of the inputted vibration, the outputted vibration had a far small average acceleration.

It will be understood from the foregoing description that the ball-and-socket joint of the present invention functions to absorb vibration and shocks effectively whereby the driving performance of the motor vehicle is improved. It will also be understood that the diametrical dimension of the joint can be suppressed to a minimum even with the provision of the elastic layer whereby the joint is compact in size and of light weight.

What is claimed is:

1. A ball-and-socket joint comprising:
   a ball head provided at an end of a shank of a rod;
   a bearing encompassing and slidably holding the ball head;
   a housing holding the bearing therein and having at a first end thereof a first opening through which said shank extends outwards, said housing having a second opening at a second end thereof opposite said first opening;
   a joining member provided at said second end for joining the housing to another member, said joining member having a head part with a peripheral flange formed thereon, said head part and said peripheral flange defining an end surface and being fitted in said second opening, said peripheral flange having a peripheral surface and a rear surface opposite said end surface said peripheral surface located between said end surface and said rear surface;

an elastic layer made of an elastic material and applied to both said end surface and said peripheral surface so that the elastic layer is interposed between said bearing and said joining member and between said housing and said joining member; and means for preventing detachment of said joining member from within said second opening;

whereby vibration and shocks applied to a side of said rod are absorbed by the elastic layer and prevented from being transmitted to a side of said joining member.

2. The ball-and-socket joint according to claim 1, wherein said end surface is a planar surface.

3. The ball-and-socket joint according to claim 1, wherein said elastic layer extends to cover said rear surface of the flange.

4. The ball-and-socket joint according to claim 1, wherein said means for preventing detachment comprises a fixing ring fitted and secured in said second opening.

5. The ball-and-socket joint according to claim 4, wherein said second opening has a shoulder for abutment with said fixing ring.

6. The ball-and socket joint according to claim 4, further comprising a closure plate fitted between said housing and said elastic layer on said end surface.

7. The ball-and-socket joint according to claim 6, wherein said closure plate is in abutment with said bearing.

8. The ball-and-socket joint according to claim 6, wherein said closure plate is in abutment with said fixing ring.

9. The ball-and-socket joint according to claim 1, wherein said peripheral flange is a flared flange diverging toward the bearing so that said end surface is formed in a flared end surface.

10. The ball-and-socket joint according to claim 9, wherein said bearing has an inner surface facing said flared end surface of the joining member, said inner surface of the bearing being formed in a shape complementary to the shape of the flared end surface.

11. A ball-and-socket joint comprising:

a ball head provided at an end of a shank of a rod;

a bearing encompassing and slidably holding the ball head;

a housing holding the bearing therein and having at a first end thereof a first opening through which said shank extends outward, slid housing having a second opening at a second end thereof opposite said first opening;

a joining member provided at said second end for joining the housing to another member, said joining member having a head part with a peripheral flange formed thereon, said head part and said peripheral flange defining an end surface and being fitted in said second opening, said peripheral flange having a peripheral surface and a rear surface opposite said end surface and being flared so as to diverge toward said bearing so that said end surface is formed as a flared end surface;

said bearing having an inner surface facing said flared end surface of the joining member, said inner surface of the bearing being formed in a shape complementary to the shape of the flared end surface;

an elastic layer made of an elastic material and applied to said end surface in at least the region of said peripheral flange so that the elastic layer is interposed between said bearing and said joining member and between said housing and said joining member;

a closure plate interposed between said elastic layer and said housing and between said elastic layer and said inner surface of the bearing; and means for preventing detachment of said joining member from within said second opening;

whereby vibration and shocks applied to a side of said rod are absorbed by the elastic layer and prevented from being transmitted to a side of said joining member.

12. The ball-and-socket joint according to claim 11, wherein said elastic layer extends to said peripheral surface of the flange.

13. The ball-and-socket joint according to claim 12, wherein said elastic layer extends to said rear surface of the flange.

14. The ball-and-socket joint according to claim 11, wherein said means for preventing detachment comprises a fixing ring fitted and secured in said second opening.

15. The ball-and-socket joint according to claim 14, wherein said fixing ring includes a thickened base end and a cylindrical portion extending from the base end, said base end abutting said rear side of the flange and said cylindrical portion abutting said peripheral surface of the flange.

16. The ball-and-socket joint according to claim 11, wherein said peripheral surface of the flange has a rounded sectional shape.

17. The ball-and-socket joint according to claim 13, wherein said means for preventing detachment comprises a fixing ring fitted and secured in said second opening and having protrusions extending into the elastic layer.

* * * * *